United States Patent [19]
Koksbang et al.

[11] Patent Number: 5,424,151
[45] Date of Patent: Jun. 13, 1995

[54] CATHODE COMPOSITION AND METHOD OF MAKING SAME

[75] Inventors: Rene Koksbang; Ib I. Olsen, both of San Jose, Calif.

[73] Assignee: Valence Technology, Inc., San Jose, Calif.

[21] Appl. No.: 259,392

[22] Filed: Jun. 14, 1994

Related U.S. Application Data

[62] Division of Ser. No. 102,026, Aug. 4, 1993, Pat. No. 5,340,368.

[51] Int. Cl.$^6$ .............................................. H01M 4/60
[52] U.S. Cl. ..................................... 429/213; 429/192
[58] Field of Search ............... 429/212, 213, 192, 194, 429/218; 204/421

[56] References Cited

U.S. PATENT DOCUMENTS

| | | |
|---|---|---|
| 4,175,055 | 11/1979 | Goller et al. |
| 4,544,615 | 10/1985 | Shishikura et al. |
| 4,569,734 | 2/1986 | Naarmann et al. |
| 4,582,575 | 4/1986 | Warren et al. |
| 4,640,749 | 2/1987 | Naarmann et al. |
| 4,792,504 | 12/1988 | Schwab et al. |
| 4,818,646 | 4/1989 | Takakubo et al. |
| 4,830,939 | 5/1989 | Lee et al. |
| 4,879,190 | 11/1989 | Lundsgaard. |
| 4,935,317 | 6/1990 | Fauteux et al. |
| 4,935,319 | 6/1990 | Ohsawa et al. |
| 4,987,042 | 1/1991 | Jones et al. |
| 4,990,413 | 2/1991 | Lee et al. |
| 5,262,254 | 11/1993 | Koksbang et al. |

*Primary Examiner*—Anthony Skapars
*Attorney, Agent, or Firm*—Linda M. Deschere

[57] ABSTRACT

In accordance with the invention, a new cathode composition is prepared in a preferred method, in situ, in a cell whereby such in situ formation results in enhanced contact between the cathode composition and the current collector and between the electrolyte layer and the cathode composition.

The new cathode composition of the invention comprises first and second polymeric materials, the first being radiation cured and ionically conductive and the second being electrochemically cured and electrically conductive. Preferably, the first is radiation cured before the second is electrochemically cured. The second polymeric material is cured in an electrochemical cell which comprises an alkali metal-containing anode layer. The cell desirably contains an electrolyte which consists of a solid ionically conductive polymeric material.

13 Claims, 2 Drawing Sheets

POLYANILINE

POLYPYRROLE

POLYTHIOPHENE

POLYPHENYLENE

CATHODE COMPOSITION AND METHOD OF MAKING SAME

This is a divisional application of U.S. patent application Ser. No. 08/102,026, filed on Aug. 4, 1993, now U.S. Pat. No. 5,340,368.

FIELD OF THE INVENTION

This invention relates to electrochemical cells and batteries comprising one or more cells, and, more particularly, to positive electrode compositions for such cells and batteries.

BACKGROUND OF THE INVENTION

Cells and batteries having an alkali metal anode (negative electrode) and finely divided metal oxide cathode (positive electrode) are known. Particularly favored are such cells comprising a lithium foil anode of a thickness of about 75 microns, and an intercalation cathode layer of a similar thickness which contains finely divided transition metal oxide, electrically conductive carbon and solid electrolyte material. An electrolyte layer having a thickness of about 25 microns is positioned between the anode and cathode and often comprises an ion conducting polymer such as polyethylene oxide complexed with an ionizable alkali metal, preferably, lithium salt. The electrolyte layer separates the anode and cathode from one another while providing transport of ions between the anode and cathode. Typically, a current collector of conductive metal is positioned on both of the electrodes away from the electrolyte layer.

The cathode (positive electrode) provides for storage of lithium ions released from the anode (negative electrode) during discharge of the battery. Such ions are releasably retained by the cathode and then are transported back to the anode during charge. The cathode is a composite of ionically and electrically conductive materials disposed between the electrolyte layer and cathode current collector plate to provide the necessary transport between such components of the cell. There are two interfaces on the cathode side of the cell, the electrolyte-cathode interface and the cathode current collector interface. Failure of the cathode material to make good contact with the cathode current collector and with the solid electrolyte layer leads to an overall increase in cell impedance. This makes it difficult to recharge the cell.

It is desirable to further enhance contact between the positive electrode material and the respective materials of the current collector and the electrolyte layer at the interfaces so as to further reduce impedance.

SUMMARY OF THE INVENTION

In accordance with the invention, a new cathode composition is prepared in a preferred method, in situ, in a cell whereby such in situ formation results in enhanced contact between the cathode composition and the current collector and between the electrolyte layer and the cathode composition.

The new cathode composition of the invention comprises first and second polymeric materials, the first being radiation cured and ionically conductive and the second being electrochemically cured and electrically conductive. Preferably, the first is radiation cured before the second is electrochemically cured. The second polymeric material is cured in an electrochemical cell which comprises an alkali metal-containing anode layer. The cell desirably contains an electrolyte which consists of a solid ionically conductive polymeric material. The polymeric material of the electrolyte layer may be similar to the ionically conductive polymeric material of the cathode composition.

In one preferred process, the cathode composition is prepared with: (a) an electrically conductive redox active polymer (first component) which is prepared by electrochemically polymerizing a polymer precursor; and (b) an ionically conductive electrolyte (second component) which is obtained by radiation or heat polymerization of a precursor. The electrically conductive Polymer and the ionically conductive polymer are thought to be the only two electrode components required. This is because the electrically conductive polymer is itself the cathode active material. Thus, no materials other than the two need be included in the cathode composition. However, added components may be desired. The cathode composition optionally includes carbon particles; and optionally includes a traditional active material selected from the group of metal chalcogenides, metal oxides and intercalation compounds.

In the preferred process of the invention, the precursor monomers of the electrically conductive polymer are electrochemically polymerized in situ in the cell. The electrochemical polymerization is, preferably, conducted after the ionically conductive polymer has been either totally or partially cured by heat or radiation.

Suitable redox active electrically conductive polymers include polypyrrole, polythiophene, polyphenylene and polyaniline. The method of the invention will be described later with reference to polypyrrole polymer formed from pyrrole monomers. However, other redox active polymers are prepared by equivalent means and will also be briefly described. For purposes of the present invention, the monomers (i.e., pyrroles) are unsubstituted, such as pyrrole itself, and substituted pyrroles (derivations of pyrrole). Examples of substituted pyrroles include, but are not limited to, alkyl and aryl pyrroles. The same applies to other redox active polymers which are prepared from or substituted and substituted monomer precursor.

The ionically conductive polymer is often simply referred to as an electrolyte or electrolyte/binder. It should be noted that the electrolyte/binder described herein is usable for both the cathode composition and for the electrolyte layer (separator) disposed between the negative and positive electrode compositions.

One radiation curable polymer composition contains polyethylene oxide (PEO), polyethylene glycol diacrylate, (PEG-DA), trimethylolpropane ethoxylated triacrylate (TMPEOTA), $LiCF_3SO_3$ and a suitable ionic conductive solvent such as ethers, esters, tetraglyme or propylene carbonate (PC).

In a preferred method, a cathode composition (composite cathode material) is formed from the above components by electrochemically curing the redox active electrically conductive polymer (first component), in situ, after radiant curing of the electrolyte/binder ionically conductive polymer (second component). The general method includes the steps of first forming a mixture comprising: i) one or more monomers polymerizable to an electrically conductive polymer; ii) an alkali metal salt; iii) an inert aprotic liquid solvent for the salt and the solvent each being in an amount sufficient to provide an electrically conductive solution having ionic species; iv) a material polymerizable by radiation or thermal treatment to an ionically conductive material;

and v) optional particles of carbon and/or an active material selected from the group of metal chalcogenides and metal oxides and intercalation compounds.

Next the aforesaid mixture is applied onto a cathode current collector and then the partial or total curing of the material (iv) polymerizable by radiation or thermal treatment occurs. This forms the positive electrode half cell element with the polymerizable monomers (i) yet to be electrochemically cured in situ.

In one embodiment, the negative electrode half cell element is obtained by forming a lithium-containing negative electrode element carrying an electrolyte composition or precursor thereof. Preferably, the precursor is at least partially radiation cured. Then, the negative electrode half cell element is placed onto the positive electrode half cell element with the electrolyte composition of the negative half cell in contact with the mixture carried on the positive half cell.

Finally, the electrically conductive polymer is formed by electrochemically reacting the one or more monomers (i) in the presence of the ionic species to provide the electrically conductive polymer. If required, added curing of the ionic polymer precursors occurs before or after the step of electrochemically forming the conductive polymer.

The step of curing (polymerizing) to form the electrolyte/binder (ionic polymer composition) may be by actinic radiation/electron beam, ultra violet, heat, chemical or other means. In a particularly preferred embodiment the compositions are cured by exposure to an electron beam.

In the step of curing to form the electrically conductive polymers, the cathodes composition is subjected to electrolytic polymerization, in which a number of solvents and salts may be used, however, water may not be used as a solvent for in situ polymerization. In preparation of the polypyrrole or redox active polymer complexes the following aprotic solvents may be used as they do not contain acidic hydrogen attached to an oxygen, or a nitrogen. They are: glymes, ethers, esters, propylene carbonate, $\gamma$-butyrolactone, nitrobenzene, dioxane dimethylformamide and acetone.

As electrolytic anions for this polymerization method, inorganic anions such as $ClO_4-$, $PF_6-$, $ASF_6-$, $CF_3-$, $SO_3-$ and $BF_4-$, and unsubstituted and substituted aromatic anions such as aromatic sulfonic acids and aromatic carboxylic acids which may have one or more identical or different substituents such as an alkyl group having 1 to 3 carbon atoms, a nitro group and a cyano group (for example), p-toluene sulfonic acid and nitrobenzene sulfonic acid) may be used. As counterpart cations, suitable alkali metal cations are $Na+$, $K+$, and $Li+$. The ions should be those capable of use in the operating cell. Therefore, the desired cation is $Li+$ and the desired anions are $AsF_6-$, $PF_6-$, $N(CF_3SO_3)_2-$, $ClO_4-$, $CF_3SO_3-$, $F_3SO_3$, $BF_4-$. $LiPF_6$ is preferred as the electrolyte salt of the completed cell.

Accordingly, the polymeric complex film is prepared by subjecting the above-mentioned pyrrole-type monomer to electrolytic polymerization in the presence of an electrolyte comprising the above-mentioned anion and cation. Upon causing an electric current to flow through a solution of pyrrole-type monomer and the electrolyte dissolved in one of the above-mentioned solvents, the polypyrrole complex film is readily formed. It is preferable that the current density in the above electrolytic polymerization be in the range of about 0.025 to 0.5 $mA/cm^2$ with 0.1 $mA/cm^2$ being preferred. The content of the pyrrole-type monomer in the electrolytic solution be in the range of 70 to 98% by weight, more preferably in the range of 75 to 90% by weight for obtaining a uniform film with high yield. Since both anions and cations are consumed during doping, it is necessary to make up any loss of electrolyte salt ($Li+$) if the conductive polymer is doped in situ. The voltage is about 4 volts vs. lithium and depends to some extent on the other components in the system (i.e., salt(s) and solvent(s)). A voltage range from about 3.5 to 4.5 volts is thought to give adequate results.

The electrolysis is usually carried out at room temperature and, under the inert condition of the assembled cell, vacuum sealed in a waterproof and air tight pouch. The temperature at which the polymerization of the pyrroles is carried out was found not to be critical, so that it can be varied within a substantial range provided that it does not fall below the solidification point, or exceed the boiling point, of the electrolyte solvent. In general, a reaction temperature of from $-40°$ to $+40°$ C. are suitable.

As stated, it is possible to prepare an electrode having only the electrically conductive (first) component and the ionically conductive (second) component. In this case, the first component (i.e., pyrrole) constitutes about 80 parts of the combined weight of the first and second components, desirably 85 parts by weight of the combined weight.

Those skilled in the art will appreciate that the steps of cell assembly may be varied so long as the step of curing the electrochemically curable polymer is conducted in situ in the vacuum sealed pouch after assembly.

The electrode having only one electrically conductive polymer complex and the ionically conductive polymer complex as the only two necessary component means that other additives such as carbon may be eliminated. The electrically conductive polymer provides the necessary conductivity without carbon. Since carbon does not contribute to the capacity, overall energy density, without carbon, is increased. Since it is not necessary to include a solid active material, such as $V_6O_{13}$, both the electrolyte layer and the cathode layer are clear. As a result, economical ultraviolet light may be used to cure both layers simultaneously, provided they are immiscible.

Accordingly, it is an object of the present invention to provide a composite cathode (positive electrode) composition having improved contact on one side with the cathode current collector and on the other side with the electrolyte layer. Another object is to provide a method for providing such composite cathode, in situ, in a cell.

These and other objects, features and advantages will become apparent from the following description from the preferred embodiments, appended claims and accompanying drawings.

DETAILED DESCRIPTION OF THE PREFERRED EMBODIMENTS

Figure 1:
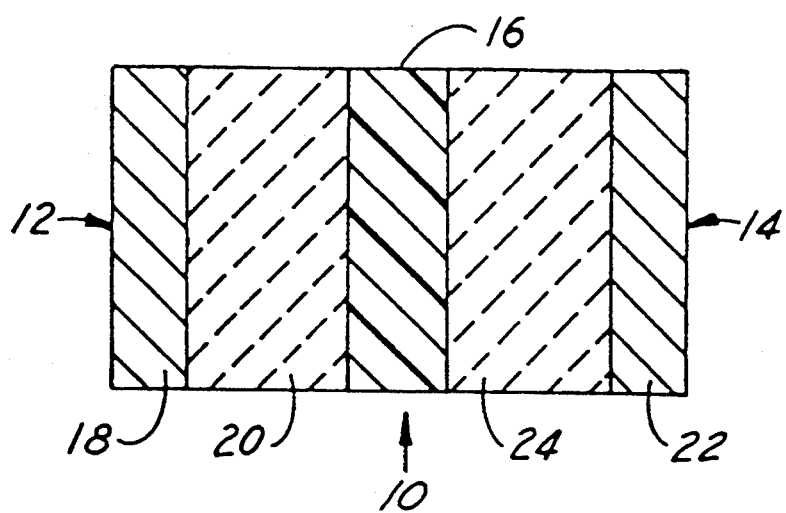
FIG. 1 is an illustration of a cross-section of a thin battery or cell embodying the invention.

As shown in the drawings, an electrochemical cell or battery 10 has a negative electrode side 12, a positive electrode side 14, and a separator 16 therebetween (FIG. 1). In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode or negative electrode composition. The positive electrode side includes current collector 22, typically of aluminum, nickel, iron, stainless steel, and/or copper foil, or such foils having a protective conducting coating foil, and a body of positive electrode active material 24. The cathode composition 24 and current collector 22 will be more specifically described below. The positive electrode active material 24 is sometimes simply referred to as the positive electrode or positive electrode composition. The separator 16 is typically a solid electrolyte, electrolyte separator. Suitable electrolyte separators (polymer electrolyte) are described in U.S. Pat. Nos. 4,830,939 and 4,990,413, each of which is incorporated herein by reference in its entirety. The electrolyte separator is a solid organic polymer matrix containing an ionically conducting powder or liquid with an alkali metal salt and the liquid is an aprotic polar solvent. Cell 10 also includes a protective covering (not shown) which functions to prevent water and air from contacting the reactive layers of the cell 10.

Cell 10 is preferably a laminar thin cell type including a lithium anode (negative electrode 20). Laminar thin-cell batteries containing lithium anodes are know in the art, and it will be appreciated that the cell can include various constructions such as bi-faced or bipolar cell designs. Examples of cell constructions include a "jelly roll" era fan folded laminate strip design as described in U.S. Pat. No. 4,879,190 incorporated herein by reference in its entirety.

Because the cell utilizes a lithium anode layer 20, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

The process of the invention forms a cathode composition 24 on the current collector 22 which may be a sheet of metal foil, an electrically conductive screen, grid, expanded metal, etched foil, electrodeposited film, woven or non-woven conductive fabric. In practice, it is preferred to use a thin metal fell having a metal, preferably the same metal, electrodeposited on the surface which will contact the cathode layer. A preferred metal is known as surface-treated nickel. A microroughened or etched surface enables better adherence of the cathode composition 24 to the current collector 22.

In practice, the thickness of current collector 22 ranges from about 5 microns to about 25 microns. Preferably, the current collector is as thin as practicable. Alternatively, the current collector can take the form of a thin polymeric film having coated thereon an electrically conductive metal. The advantage of this current collector is that it is extremely light-weight and can be utilized in extremely thin layers. An example of such a material is a polyethylene terephthalate substrate having electrodeposited thereon a first layer of copper and a second layer of nickel. The thickness of such a layer is typically about one micron but it may be as thin as practicable to minimize overall thickness of the cell.

The cathode composition is typically applied as a paste to the current collector and then radiation or thermally cured. A traditional cathode composition includes an active cathodic material such as a transition metal oxide, or an intercalation compound and electrically conductive carbon particles; and an ionically conductive electrolyte. In the method of the invention, cathode composition is prepared with: (a) an electrically conductive redox active polymer (first component) which is prepared by electrochemically polymerizing a polymer precursor; and (b) an ionically conductive electrolyte (second component) which is obtained by radiation or heat polymerization of a precursor. The electrically conductive polymer and the ionically conductive polymer are the only two electrode components required. This is in contrast to conventional methods.

In the process of the invention, the precursor monomers of the electrically conductive polymer are electrochemically polymerized in situ, in the cell 10. The electrochemical polymerization is conducted after the ionically conductive polymer has been either totally or partially cured, preferably, by heat or radiation. The constituents of the electrode composition will now be described.

A. Electrically Conductive Polymer Cathode Component—First Component

Suitable redox active electrically conductive polymers include polypyrrole, polythiophene, polyphenylene and polyaniline. The method of the invention will be described later with reference to polypyrrole formed from pyrroles. For purposes of the present invention, pyrroles are unsubstituted pyrrole itself, and substituted pyrroles (derivations of pyrrole). Examples of substituted pyrroles, include but are not limited to, alkyl and aryl pyrroles. Monomers and comonomers of pyrrole and derivatives of pyrrole are described in U.S. Pat. No. 4,582,575 which is incorporated herein by reference in its entirety. As used herein, the term "electrically conductive polymer complex" refers to the conductive polymer electrically formed with one or more monomers (i.e., pyrrole and thiophene), or with another moiety such as a monomer which may not have conductive properties, or with an ionic dopant (i.e., polypyrrole and ions from a metal salt), and combinations thereof. All electrically conductive polymers are characterized by fast transport of electrons across the polymer. The selected conductive polymer should have a conductivity of $10^{-4}$ Siemens/cm (S/cm) and preferably $10^{-3}$ S/cm or higher. It is preferred that the conductivity be in a range of 0.001–0.01 S/cm. Electrically conductive polymers are also known to be capable of transporting ions, such as Li+.

The basic properties of redox active conducting polymers useful in the invention are generally described by Mercouri G. Kanatzidis in an article entitled "Conductive Polymers" published in the Dec. 3, 1990 issue of Chemical and Engineering News, pp 36–54. Basic exemplary methods for preparing and applying such conductive polymers are also described in Kanatzidis' article. Properties and methods pertinent to the invention are described below.

Figure 2:
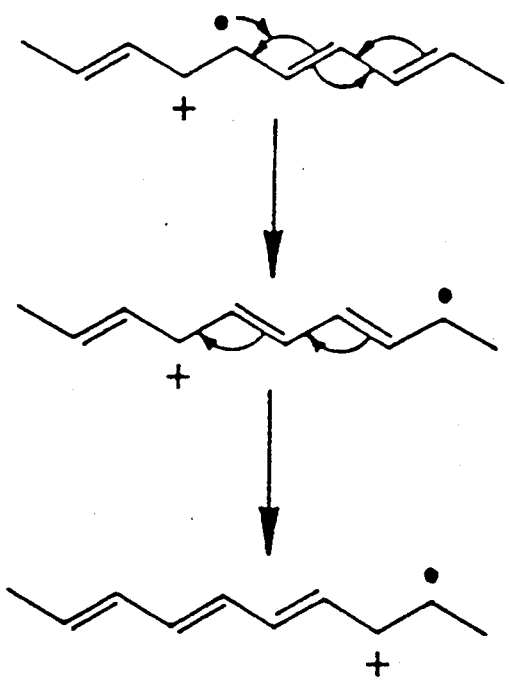
FIG. 2 illustrates movement of cations (+) and electrons (.) along a conductive polymer chain of single and double bonds, also known as conjugated double bonds.

All conductive polymers are characterized by pi-conjugated systems or conjugated double bonds which are single and double bonds alternating along a polymer chain. The alternating single and double bonds give rise to certain unique electrical properties. The movement of an electron and a corresponding positively charged species along the polymer chain is illustrated in FIG. 2. The ability to transport charged species along the polymer chain and the ability to conduct an electron along the polymer chain make such conductive polymers uniquely suited to ionic transport and electronic transport functions. Electron transport is required for the cathode. It should be noted that the conductivity of the polymers varies widely up to about 10,000 Siemens/cm (S/cm). Doping materials include lithium, halogens and chlorine oxides.

Figure 3:
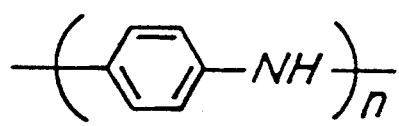
FIGS. 3–6 show the basic unit of conductive polymers of polyaniline (3), polypyrrole (4), polythiophene (5), and polyphenylene (6).

Polyaniline, FIG. 3, consists of about 1,000 or more repeating units. Polyaniline may exist in several oxidation states with electrical conductivity varying from $10^{-11}$ S/cm, to more than 10 S/cm. Polyaniline has a wide range of attractive electrical and electrochemical properties and exhibits good stability.

Figure 4:
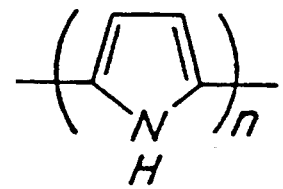
Figure 5:
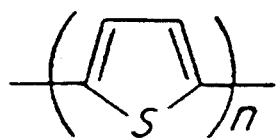
Figure 6:
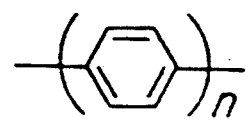

The conductive polymers polypyrrole and polythiophene are shown in FIGS. 4 and 5. All such polymers are traditionally formed by chemical and electrochemical methods. A brief description of such traditional methods will facilitate understanding of the new methods of the present invention. Traditional methods include forming solutions containing precursor monomers, aniline, pyrrole or thiophene and a metal salt. A foil may then be coated by slowly passing the foil through the solution and simultaneously applying a voltage or current between a counter-electrode in the solution and the foil, as the working electrode. The conductive polymer layer or sheet is then removed from the foil, followed by lamination of the polymer sheet onto a desired substrate. Alternatively, other components may also be laminated onto the conductive polymer sheet. Polyphenylene (FIG. 6) is formed from a solution containing benzene. It is necessary to include conductive polymer dopant to achieve conductivity.

Characteristics of conductive polymers and their formation are described in U.S. Pat. Nos: 4,569,734, 4,818,646, 4,640,749, 4,987,042, 4,935,319 and 4,544,615 which are each incorporated herein by reference in their entirety.

B. Ionically Conductive Polymer Cathode Component—Second Component

The ionically conductive polymer is often simply referred to as an electrolyte or electrolyte/binder. It should be noted that the electrolyte/binder described herein is usable for both the cathode composition and for the electrolyte separator 16 disposed between the negative and positive electrode compositions 20 and 24. Accordingly, the properties of the electrolyte/binder (e/b) polymer will be described with reference to both uses. It should also be noted that if the electrolyte layer is applied uncured (i.e., wet) onto the cathode composition, then it may be preferable to have different electrolyte/binders in the electrolyte layer and in the cathode. It should also be noted that if the electrolyte layer is applied uncured (i.e., wet) onto the cathode composition, then it may be preferable to have different electrolyte/binders in the electrolyte layer and in the cathode. It is thought that such difference will prevent diffusion of the uncured redox active polymer from the wet cathode mixture into the wet electrolyte layer.

The (e/b) polymers have repeating units containing at least one heteroatom such as an oxygen or nitrogen atom. They can be represented as polymers having the repeating unit

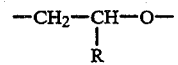

wherein R is hydrogen or a group Ra, —CH$_2$ORa, —CH$_2$OReRa, —CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula —CH$_2$—CH$_2$Op— wherein p is a number from 1 to 100, preferably 1 or 2: or having the repeating unit

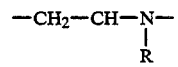

wherein R is Ra or ReRa, as defined above; or having a repeating unit

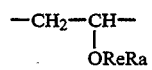

wherein Re and Ra are as defined above. Copolymers of the above polymers may also be useful.

The electrolyte/binder polymer is typically prepared from a composition which comprises a liquid, monomeric or prepolymeric polymerizable compound, and a solution of an ionizable alkali metal salt. Electrolyte/binder compositions and methods for forming such compositions from precursors are described in U.S. Pat. Nos: 4,830,939 and 4,935,317 which are incorporated herein by reference in their entirety.

Ionizable alkali metal and alkaline earth salts useful in the electrolyte include those salts conventionally used in electrochemical cells. Representative examples are Li+, Na+, K+, Mg$^{2+}$, Ca$^{2+}$, and ammonium salts of less mobile anions of weak bases having a large anionic radius. Examples of such anions may be selected from the group consisting of I—, Br—, SCN—. ClO$_4$—, BF$_4$—, PF$_6$—, AsF$_6$—, CF$_3$COO—, CF$_3$SO$_3$—, CF$_3$CO$_3$—, B$_{12}$H$_{12}$$^{2-}$, B$_{10}$Cl$_{10}$$^{2-}$, and Bϕ4—, where ϕ is C$_6$H$_5$, an alkyl chain or an aryl chain, wherein such salt cation and anion are maintained in stoichiometric amounts. More specific examples are as set forth earlier herein below with reference to the salts used for electrochemical formation of the redox active polymer in situ.

The solvent for the salt can be any low volatile aprotic polar solvent. Preferably, these materials are characterized by a boiling point greater than about 80° C. Low volatility simplifies manufacture and improves shelf life. If the polymeric network is formed by radiation polymerization, the solvent should be inert to the radiation and likewise if the network is formed by thermal polymerization, the solvent should be inert in this regard. In particular, the solvent should not scavenge free radicals. Representative examples are propylene carbonate, -butyrolactone, 1.3-dioxolane, phentydrone (THF, tetrahydro-q-fluorenone) and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme and heptaglyme are also desirable solvents.

Compounds which yield a conductive polymer contain a heteroatom capable of forming donor-acceptor bonds with the alkali metal cation. Useful polymerizable compounds are described next.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor-acceptor bonds with an alkali metal cation and are terminated by polymerizable moieties. These compounds yield a conductive supportive matrix. More specifically, they are preferably low molecular weight oligomers of the formulae (I)–(III) below

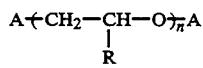 (I)

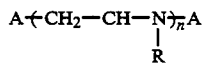 (II)

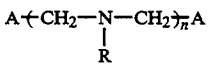 (III)

where n is about 3 to 50 and R is hydrogen or a C1–C3 alkyl group, which are terminated by ethylenically unsaturated moieties or glycidyl moieties represented by A.

A particularly useful group of polymerizable compounds is obtained by reacting a polyethylene glycol with acrylic or methacrylic acid. Also useful in the present invention are curable materials such as acrylated epoxies, eg Bisphenol A epoxy diacrylate, polyester acrylates, copolymers of glycidyl ethers and acrylates or a vinyl compound such as N-vinylpyrrolidone. The latter provide a non-conductive matrix.

The curable electrolyte mixture of this invention contains at least 45% by weight and preferably 10 to 25% by weight of the polymerizable compound, as well as 5 to 20% by weight of the alkali metal salt. The exact amount of the polymerizable compound and the solvent should be adjusted to provide the optimum combination of strength and conductivity for the particular application. If the mixture contains greater than about 55% polymerizable material, the electrolyte exhibits poor conductivity. In those cases in which the electrolyte composition itself or an electrode composition containing the electrolyte is coated on a supporting member, such as a current collector or an electrode half element, the electrolyte often is not required to have the structural integrity of a free standing film. In those applications it is permissible and advantageous to use a higher quantity of the inert liquid because greater conductivity can be achieved, for example it is advantageous to use about 70 to 80% of the radiation inert liquid.

Preferably, the aforementioned polymerizable polyethylenically unsaturated compounds have a molecular weight of about 200 to 2,000 and more preferably 200 to 800. Still more preferably they are liquids at temperatures less than 30° C. Examples of curable materials include polyethylene glycol-300 diacrylate (average PEO molecular weight about 300), polyethylene glycol 480 diacrylate (average PEO molecular weight about 480) and the corresponding methacrylates.

It may be desirable to include a curable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such as trimethylolpropopane triacrylate (TMPTA), trimethylolpropane ethoxylated triacrylates (TMPEOTA) or trimethylolpropanepropoxy triacrylate may be used to introduce crosslinking of the polymer. Monoacrylates may be used in an amount of about 5 to 50% by weight based of the total amount of radiation polymerizable material. The triacrylates are used in amounts of about 2 to 30% by weight on the same basis.

One radiation curable polymer composition contains polyethylene oxide (PEO), polyethylene glycol diacrylate, (PEG-DA), trimethylolpropane ethoxylated triacrylate (TMPEOTA), LiCF$_3$SO$_3$ and a suitable ionic conductive solvent such as tetraglyme or propylene carbonate (PC).

C. Optional Components

If desired, an active material may be included in the cathode composition in addition to the redox active polymer. As used herein, the term active material is a material which takes part in the electrochemical reaction of charge or discharge. The electrically conductive polymer of the invention is an active material, other active materials, which may be added, may be selected from the group of metal chalcogenides, metal oxides, and other similar intercalation compounds. The added positive electrode active material is preferably transition metal chalcogen compound having a reversible lithium insertion ability, wherein the transition metal is at least one selected from the group consisting of Ti, V, Cr, Mn, Fe, Nb, Mo, Ta and W, and the chalcogen is at least one selected from the group consisting of O, S and Se. Preferred intercalation compounds and electrically conductive materials useful in the present invention are as follows. Transition metal oxides and sulfides: V$_6$O$_{13}$, V$_2$O$_5$, MoO$_2$, TiS$_2$, MnO$_2$, V$_2$O$_5$, MoS$_3$, Cr$_3$O$_6$, Li$_x$V$_3$O$_8$, FeS, NiS, CoO and CuO. Other examples are described in the literature. The active cathode material preferably has a particle size of less than 1 micron but can range up to 20 microns. A particularly preferred intercalation compound is V$_6$O$_{13}$ having a particle size less than 5 microns, and particularly less than one micron.

If desired, electrically conductive particles of carbon may be included in the cathode composition. Carbon particles for use in electrodes may be obtained from a variety of sources such as Union Carbide, Noury Chemical and other major chemical companies. In an as-received condition, such carbon particles have a BET surface area on the order of hundreds-of-square meters per gram. The particles have an average or median particle size or equivalent average diameter in the range of about 10 to about 100 nanometers (0.01 to 0.1 microns), and typically in the order of 30 nanometers. Thus, the carbon particles are very fine and of submicron size. One particularly suitable carbon is known as Shawinigan carbon black. The material may be a powder or in lumps. Irrespective of the form of the original material, the carbon may be milled to reduce agglomerates present in an as-received condition, a typical carbon powder has particles of a size less than 100 microns, usually less than 10 microns, and often of micron or submicron size. Shawinigan carbon black has particle size on the order of less than one micron.

D. Formation of Cathodes and Cell (Battery)

By way of example, a cathode is formed from the above-described components, by electrochemically curing the redox active electrically conductive polymer (first component), in situ after radiant curing of the electrolyte/binder ionically conductive polymer (second component). The general method includes the steps of first forming a mixture comprising: i) one or more monomers polymerizable to an electrically conductive polymer; ii) an alkali metal salt; iii) an inert aprotic liquid solvent for the salt, the salt and the solvent each being in an amount sufficient to provide an electrically conductive solution having ionic species; iv) a material polymerizable by radiation or thermal treatment to an ionically conductive material; and v) optional particles of carbon and/or an active material selected from the group of metal chalcogenides and metal oxides and intercalation compounds.

Next the aforesaid mixture is applied onto a cathode current collector and then the partial or total curing of the material (iv) polymerizable by radiation or thermal treatment occurs. This forms the positive electrode half cell element with the polymerizable monomers (i) yet to be electrochemically cured in situ.

In one embodiment, the negative electrode half cell element is obtained by forming a lithium-containing negative electrode element carrying an electrolyte composition or precursor thereof. Preferably, the precursor is at least partially radiation cured. Then, the negative electrode half cell element is placed onto the positive electrode half cell element with the electrolyte composition of the negative half cell in contact with the mixture carried on the positive half cell.

Finally, the electrically conductive polymer is formed by electrochemically reacting the one or more monomers (i) in the presence of the ionic species to provide the electrically conductive polymer. If required, added curing of the ionic polymer precursors occurs before or after the step of electrochemically forming the conductive polymer.

The step of curing (polymerizing) to form the electrolyte/binder (ionic polymer composition) may be by actinic radiation/electron beam, ultra violet, heat, chemical or other means. In a particularly preferred embodiment the compositions are cured by exposure to an electron beam. The electron beam is capable of generating free radicals and initiating polymerization without any photoinitiator. To use other forms of radiation, a photoinitiator may be required. Similarly, to cure the compositions by heating, a thermal initiator is required. Examples of thermally cured polymers are set forth in U.S. Pat. No. 4,792,504 to Schwab et al, which is hereby incorporated by reference in its entirety.

In the step of curing to form the electrically conductive polymers, the cathode composition is subjected to electrolytic polymerization. Such polymerization is possible using a number of solvents and salts, however, water may not be used as a solvent for in situ polymerization. Suitable solvents were described earlier herein below. Electrolytic cations and anions for this were set forth herein above.

The polymeric complex film is prepared by subjecting the monomer to electrolytic polymerization in the presence of an electrolyte comprising the anions and cations. Upon causing an electric current to flow through a solution of monomer and the electrolyte dissolved in one of the solvents, the redox active complex film (i.e., polypyrrole) is readily formed. It is preferable that the current density and voltages in the above electrolytic polymerization be in the ranges stated earlier, of about 3.5 to about 4.5 volts, preferably about 3.7 to about 4 volts and about 0.025 to about 0.5 mA/cm$^2$, preferably about 0.1 mA/cm$^2$. The precursor monomer in the electrolytic solution should be in the range of 70 to 98% by weight M, more preferably in the range of 75 to 90% by weight for obtaining a uniform film with high yield. Since both anions and cations are consumed during doping, it is necessary to make up any loss of electrolyte salt (Li+) if the conductive polymer is doped in situ.

The electrolysis is usually carried out at room temperature and under the inert condition of the assembled cell. The temperature at which the polymerization of the pyrroles is carried out was found not to be critical, so that it can be varied within a substantial range provided that it does not fall below the solidification point, or exceed the boiling point of the electrolyte solvent. In general, a reaction temperature of from $-40°$ to $+40°$ C. are suitable.

As stated, it is possible to prepare an electrode having only the electrically conductive (first) component and the ionically conductive (second) component. In this case, the first component constitutes about 80 parts of the combined weight of the first and second components, desirably 90 parts and preferably 85 parts by weight of the combined weight. If an added active material, such as vanadium oxide, is to be used, the amounts of electrically conductive polymer, metal oxide, and ionically conductive materials (electrolyte/binder) are as follows, based on 100 parts of combined weight: 50, 10 and 40. If it is desired to include carbon particles, the relative portions are as set forth in Table I.

TABLE I

| Typical Cathode Composition | Percent by Weight | |
|---|---|---|
| | Range | Preferred |
| Active Material* | 50–80 | 45.0 |
| Carbon | 2–15 | 10.0 |
| Propylene Carbonate (PC) | ** | 33.0 |
| PolyEthylene Oxide (PEO) | ** | 1.0 |
| PolyEthyleneGlycolDiAcrylate (PEGDA) | ** | 9.0 |
| TriMethylPolyEthylene Oxide TriAcrylate (TMPEOTA) | ** | 2.0 |

*Designates electrically conductive polymer alone or in combination with other active materials, such as metal oxides, as described herein.
**The balance of the composition (usually 15-50) is constituted by these components in the relative proportions given as preferred.

Those skilled in the art will appreciate that the steps of cell assembly may be varied so long as the step of curing the electrochemically curable polymer is conducted in situ in the vacuum sealed pouch after assembly. Accordingly, there are many variations which fall within the scope of the invention. A few such variations will now be described.

The cathode is coated onto nickel foil followed by electron beam curing (cross-linking/polymerization) of the acrylate component. Then the electrolyte is coated on top of the cathode and cured with ultraviolet light. The lithium electrode is applied on top of the cured electrolyte/separator and the battery is finally placed in a flexible pouch which is heat sealed under vacuum. Then, the electrochemical curing of the electrically conductive polymer, i.e., pyrrole, occurs, in situ, and within the water-proof and essentially air-tight pouch previously vacuum sealed.

The completed cell may be manufactured utilizing any of a number of different methods. For example, once each of the anode layer, electrolyte layer and cathode/current collector layer are manufactured, they may be laminated together to form a solid state cell. Lamination typically occurs by the application of heat and pressure. Then, the electrochemically polymerizable polymer portion of the cathode is formed in the cell (in situ).

Alternatively, however, the electrochemical device can be assembled "wet" and then radiation cured in situ. For example, a lithium coated foil member can be coated with the radiation polymerizable electrolyte composition and overcoated with the cathode coating composition/current collector substrate. These structures can be cured by exposure to electron beam or another source of actinic radiation. Finally, the electrochemically polymerizable polymer portion of the cathode is formed in situ. It should be noted that in this scenario, the electrolyte layer and the electrolyte in the cathode are cured together before electrochemical polymerization. The unpolymerized pyrrole may diffuse into the electrolyte layer. Such diffusion must be limited since pyrrole will react with lithium.

Thus, in one method the current collector substrate may be coated with a polymerizable cathode composition. This structure is overcoated with a layer of the radiation polymerizable electrolyte composition described above and assembled with an anodic member such as a lithium foil member or a lithium coated nickel or aluminum member. This assembly may be cured by exposure to electron beam radiation and electrochemical treatment to complete formation of the cathode.

The process described above can also be reversed. An anodic metal foil member such as lithium coated metal foil can be coated with the radiation polymerizable electrolyte composition described above. A polymerizable cathode composition is coated over the current collector and is assembled with the anode and electrolyte layers. The assembly is subjected to electron beam radiation and to electrochemical reaction in the cell in accordance with the present invention.

In another process, the anodic foil member of the current collector substrate may be coated with the appropriate cathode or electrolyte composition and that composition may be cured (e.g., by exposure to radiation when it is radiation curable). The cured composition may be overcoated with the other of the electrolyte or cathode composition thereafter, and the overcoating may be cured or the remaining anodic foil member or current collector substrate may be laminated and then the overcoating cured. Finally, electrochemical treatment forms the electrically conductive polymer (i.e., polypyrrole) in the cell from the pyrrole precursors present in the cathode composition.

While this invention has been described in terms of certain embodiments thereof, it is not intended that it be limited to the above description, but rather only to the extent set forth in the following claims.

The embodiments of the invention in which an exclusive property of privilege is claimed are defined in the appended claims.

We claim:

1. An electrochemical cell comprising an anode (negative electrode); a cathode (positive electrode); and an electrolyte layer disposed between the anode and the cathode, the improvement wherein the cathode comprises two polymeric materials, one being an ionically conductive polymer and the other one being an electrically conductive polymer having single and double bonds alternating along a main polymer chain.

2. An electrochemical cell comprising
   a) an anode (negative electrode) comprising lithium;
   b) an electrolyte layer comprising a lithium salt and an ionically conductive polymer;
   c) a cathode (positive electrode) having a composition comprising first and second polymeric materials, the first being an electrically conductive polymer having single and double bonds alternating along a main polymer chain and the second being an ionically conductive polymer having ethene-based repeat units.

3. The cell according to claim 2 wherein the first material is at least one selected from the group consisting of polyaniline, polypyrrole, polythiophene, polyphenylene and derivatives and mixtures thereof.

4. The cell according to claim 2 wherein the ethene-based repeat units contain at least one heteroatom.

5. The cell according to claim 4 wherein the second material is represented as polymers having the repeating unit

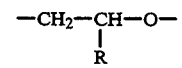

wherein R is hydrogen or a group Ra, —CH$_2$ORa, —CH$_2$OReRa, —CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula —CH$_2$—CH$_2$Op— wherein p is a number from 1 to 100 g, preferably 1 or 2:
or having the repeating unit

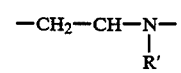

wherein R' is Ra or ReRa, as defined above; or having a repeating unit

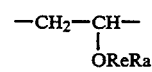

wherein Re and Ra are as defined above and copolymers of the above polymers.

6. The cell according to claim 2 wherein the anode consists essentially of a metal foil coated with one of lithium, a lithium alloy and a compound containing lithium.

7. The cell according to claim 2 wherein the cathode comprises an electrically conductive substrate and the cathode composition carried on such substrate.

8. The cell according to claim 2 wherein the second material is represented as polymers having the repeating unit of any of the following formulae (I)–(III) below:

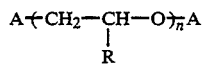 (I)

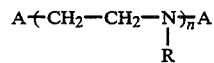 (II)

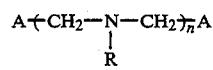 (III)

where n is about 3 to 50 and R is hydrogen or a C1–C3 alkyl group, which are terminated moieties represented by A.

9. The cell according to claim 8 wherein the moieties represented by A are ethylenically unsaturated moieties or glycidyl moieties.

10. The cell according to claim 4 wherein the heteroatom is selected from the group consisting of nitrogen and oxygen.

11. The cell according to claim 1 wherein the electrically conductive polymer is selected from the group consisting of polyaniline, polypyrrole, polythiophene, polyphenylene and derivatives and mixtures thereof.

12. The cell according to claim 1 wherein the ionically conductive polymer has ethene-based repeat units, each unit containing at least one heteroatom.

13. The cell according to claim 12 wherein the heteroatom is selected from the group consisting of nitrogen and oxygen.

* * * * *